United States Patent

[11] 3,588,689

| [72] | Inventor | Harry F. Crawford |
| | | R.D. #2, Steinmetz & Mill Roads, |
| | | Schwenksville, Pa. 19473 |
| [21] | Appl. No. | 833,533 |
| [22] | Filed | June 16, 1969 |
| [45] | Patented | June 28, 1971 |

[54] VARIABLE IMPEDANCE SYSTEM FOR ELECTRICAL CABLE FAULT LOCATING AND TEMPERATURE MONITORING
8 Claims, 5 Drawing Figs.

[52] U.S. Cl. .................................... 324/52,
73/358, 340/227C
[51] Int. Cl. .................................... G01r 31/08,
G01k 11/06
[50] Field of Search ............................... 324/52;
340/227C; 338/26; 73/358, 342; 174/11

[56] References Cited
UNITED STATES PATENTS

| 539,939 | 5/1895 | Gharky | 324/52 |
| 1,034,609 | 8/1912 | Friendly | 324/52 |
| 1,957,565 | 5/1934 | Wheeler | (338/26UX) |
| 2,185,944 | 1/1940 | Holmes | (340/227C) |
| 2,476,317 | 7/1949 | Nelson et al. | 324/52 |
| 2,490,377 | 12/1949 | MacLean | 324/52X |
| 3,257,530 | 6/1966 | Davies | (340/227C) |
| 3,510,762 | 5/1970 | Leslie | 324/52 |

FOREIGN PATENTS

| 390,028 | 3/1933 | Great Britain | 340/227C |

Primary Examiner—Gerard R. Strecker
Attorney—Paul and Paul

ABSTRACT: An apparatus is disclosed comprising sensors made of strip conductors covered with a nonconducting thermoplastic envelope which are wrapped helically around the outside metallic shielding tape of an insulated conductor of a pipe-type cable so as to provide, in cooperation with such tape, a uniform capacitance per unit length of cable, as well as a uniform resistance per unit length. Upon occurrence of a fault, a sensor is either open circuited or caused to contact the shielding tape by the energy dissipated at the fault. A calibrated bridge measurement of the effective capacitance or resistance reveals the distance to and location of the fault.

PATENTED JUN28 1971

3,588,689

INVENTOR.
Harry F. Crawford

BY

Paul + Paul

ATTORNEYS.

VARIABLE IMPEDANCE SYSTEM FOR ELECTRICAL CABLE FAULT LOCATING AND TEMPERATURE MONITORING

BACKGROUND OF THE INVENTION

1. Field of the Invention

This invention lies in the field of cable fault location systems and, more particularly, fault location systems for use with pipe-type power cables susceptible to unstable high-resistance faults.

2. Description of the Prior Art

Location of faults in pipe-type power cables and other similar cables has been a chronic problem due to both the inaccessibility of the cables within a steel pipe and the unstable high-resistance nature of the faults which may occur therein. Pipe-type cables conventionally comprise a plurality of single-conductor insulated cables drawn into a steel pipe buried in the earth, the pipe then being filled with a pressurized insulating fluid. To provide a low resistance path for charging current and return current in the event of a fault, the single-conductor cables are wrapped with a grounded copper shielding tape, over which metallic skid wires are wound to prevent damage to the cable while it is being drawn in. In the event of a fault, the return current through the grounded copper shielding tape and other parallel return paths trips out relays in so short a time that damage is usually confined to the location of the fault between the center conductor and the shielding tape, and the fault may be of extremely high and unstable resistance. The prior art discloses a number of methods whereby the location of faults can be determined by impedance measurements. These methods generally utilize a loop comprised of the conductor, the fault, and a return lead outside of the conductor. This technique is ineffective where the fault itself is of extremely high and unstable resistance. Fault location by application of surge voltage impulses to the cable while exploring with a magnetic pickup is useless in the case of a pipe-type cable, because of the magnetic shielding effect of the steel pipe.

SUMMARY OF THE INVENTION

The primary object of this invention is to provide apparatus for locating faults in pipe-type cable systems which is simple, reliable, inexpensive, effective for the purpose, and which overcomes the disadvantages of the prior art.

It is a further object of this invention to provide a method for locating faults in cable systems which is readily adaptable to present techniques of constructing and placing cable systems.

It is a further object of this invention to provide apparatus with which to accurately and quickly locate unstable high resistance faults in pipe-type cable systems.

It is a still further object of this invention to provide means for the location of faults in pipe-type cable systems whereby all measurements are at ground potential.

Accordingly, this invention provides a novel and effective means for determining the location of a fault in a pipe-type cable system which comprises winding ribbon sensors in a multiple helix over the metallic shielding tape of a cable, each ribbon sensor being composed of a strip conductor insulated by an envelope of a suitable thermoplastic material. The sensors are placed on the surface of the wrapped metallic shielding and in opposite lay under the cable skid wires. The ribbon sensor and the shielding tape are coupled into a conventional bridge measuring circuit at a convenient location.

Instead of using ribbon sensors disposed under the skid wires, the ribbon sensors may be dispensed with and the skid wires themselves may be provided with suitable thermoplastic insulating envelopes and used instead as the sensors.

In operation, upon the occurrence of a cable fault there is a good probability that the thermoplastic envelope of a ribbon sensor in the vicinity of such fault will melt away due to the dissipated energy, with the strip conductor within either being burnt so as to open circuit the sensor, or fused or otherwise contacted to the copper shielding. A capacitive or resistive bridge measurement respectively is made to determine the sensor impedance, which is proportional to sensor length. Calibration of the sensor, made from initial measurements of capacitance and resistance for the full length of the line, or comparison with measurements on sensors of unfaulted phases of the line, permits accurate determination of the fault location.

DESCRIPTION OF THE PREFERRED EMBODIMENT

Figure 1:
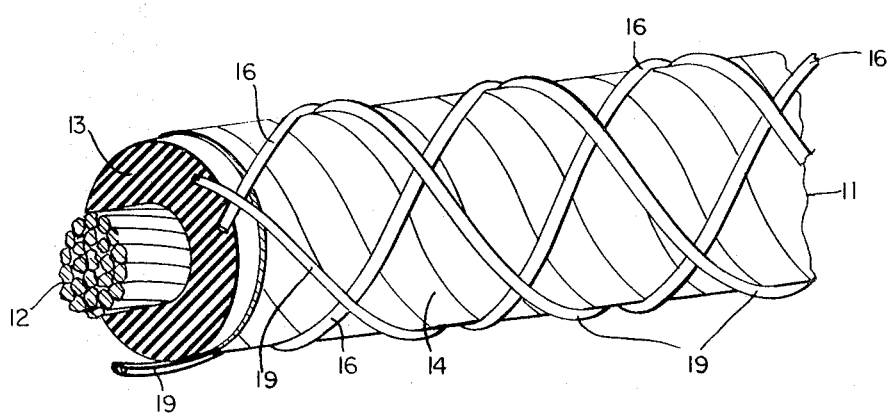
FIG. 1 shows a perspective view of a cable comprised of an insulated conductor covered with shielding tape, and having ribbon sensors and skid wires wrapped thereon.
Figure 3:
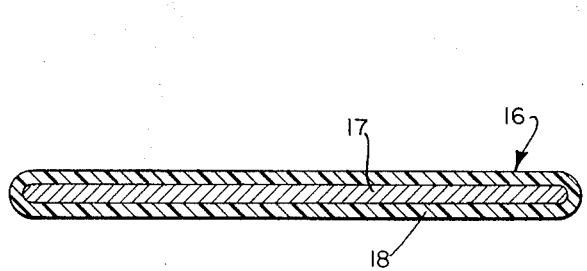
FIG. 3 is a cross-sectional view of a ribbon sensor.
Figure 2:
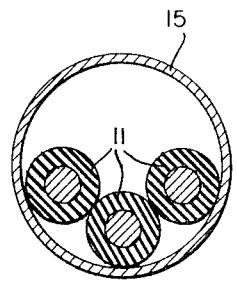
FIG. 2 is a cross-sectional view of a pipe-type cable with three single-conductor insulated cables contained therein.

Referring now to the drawing, FIG. 1 shows a single-conductor cable 11 having a center conductor 12 embedded in insulation 13 and covered with conventional wrapped copper shielding tape 14. Tape 14, which is grounded, surrounds the cable and provides a low resistance return for any fault current. It is standard practice to wind on top of the copper shielding tape D-shaped skid wires in order to prevent damage to the cables during the process of drawing them into the pipe. Three such cables are shown disposed within a pip 15 in FIG. 2.

Referring again to FIG. 1, two ribbon sensors 16, each composed of a strip conductor 17 and an envelope 18, are wound in a double helix over the shielding tape 14 and in opposite lay under the skid wires 19, so as to give a maximum number of crossovers of the ribbon sensors and the skid wires. The sensor may suitably be about 10 mils thick and one-fourth inch in width. The sensor width must be relatively great so as to form an appreciable capacitance with respect to the shielding tape 14 and to minimize deformation of the electrostatic shielding under pressure of the skid wires. The material of the strip conductor 17 may be copper or of a suitable material of higher resistivity.

It is seen that the strip conductor is normally completely insulated by the envelope around it. The envelope is composed of a suitable insulating thermoplastic such as nylon. Any insulating material may be used which will withstand normal operating temperatures but will quickly melt away upon the occurrence of a cable fault and resulting heat dissipation. The strip conductor 17 is separated from the metallic shielding tape 14 only by the thickness of the nylon envelope 18, the envelope serving as both insulator and dielectric between the two metallic surfaces. The capacitance which appears between the strip conductor and the copper shielding tape is proportional to the length of the strip conductor, this being proportional to but greater than the length of the cable due to the helical manner of winding the ribbon sensor.

Figure 4:
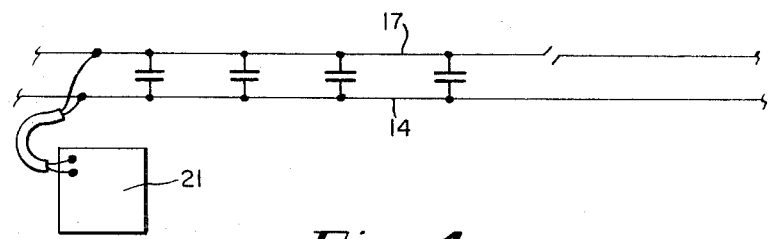
FIG. 4 is a schematic representation of a measuring circuit utilized with an open circuited ribbon sensor.
Figure 5:
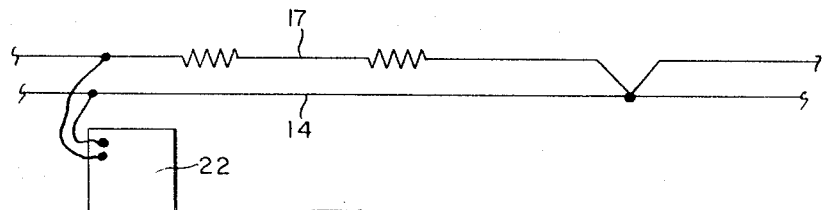
FIG. 5 is a schematic representation of a measuring circuit utilized with a ribbon sensor making metallic contact with the shielding tape.

Referring now to FIG. 4, a schematic diagram is shown of one manner in which this invention is used. Upon the occurrence of a cable fault which burns open or otherwise open-circuits a ribbon sensor 16, the capacitor formed by strip conductor 17 and copper shielding tape 14 is terminated at the location of the open circuit. Thus, the effective impedance between said strip conductor and said copper shielding tape as measured at a specific terminal point will appear to be a capacitance proportional to the distance from such given point to the location of the open circuit. This capacitance, distributed uniformly per unit length but represented by lumped parameters in FIG. 4, is measured by a standard capacitance bridge 21, the capacitance reading being converted into distance by comparison with a previously calibrated capacitance reading for the full length of the cable line. Conversely, if the fault is of such a nature as to cause the strip conductor 17 to be welded or otherwise placed into metallic contact with shielding tape 14 at the location of the fault, the effective impedance between the two same terminals at the same measuring point is the uniformly distributed resistance of conductor 17 in series with shielding tape 14. Accordingly, a conventional bridge resistance measurement is made with a bridge 22 and calibrated in terms of the full line length. Such calibration measurement is made by coupling strip conductor 17 to tape 14 at the cable end opposite measuring bridge 22. Also, as was noted before, a fault may produce contact between the strip conductor 17 and the skid wire 19. In this case, a bridge measurement is made of the combined resistance of strip conductor 17 in series with skid wire 19. An inherent advantage of this invention is that each of the measurements described is made to normally grounded components of the line, thus obviating the problem of coupling to the conductor or other components which are normally operated at high potential.

It is to be noted that none of the above-described measurements are affected by the resistance of the fault between the center conductor 12 and the shielding tape 14. The fault itself is not part of the measuring circuit. It is because of this fact that my invention is efficient and sensitive in detecting and locating high resistance faults.

From the above it is seen that the effectiveness of this invention lies in the design and placement of the ribbon sensor 16 so as to produce an effective measurable capacitance between such ribbon sensor and the copper shielding tape 14, as well as a measurable resistance of the ribbon sensor when in series with the shielding tape. Any other sensor could be utilized if it exhibited the same electrical properties in cooperation with the shielding tape 14. Accordingly, in this invention the skid wire 19 may be used by itself as an effective sensor.

The skid wire is conventionally D-shaped with the flat side inside the helix so that it lies flat against the metallic shielding tape and thus will provide a suitably broad capacitor plate. The skid wire is conventionally made of brass having a resistivity about 5 times that of the copper shielding tape, which improves the precision of the resistance measurement. It is also feasible to use brass or bronze of substantially higher resistivity, if desired. In practice, such skid wires have been coated with nylon, for the purpose of reducing pulling-in friction. Ordinarily, negligible damage is done to the nylon coating during the pulling-in operation and, accordingly, the skid wire itself can be used as the sensor in this invention. The nylon coating on the flat side of the D may be made suitably thin to provide optimum capacitance for the desired purpose. A double helix of skid wires is normally used, thus doubling the probability that a fault will burn open a skid wire or cause metallic contact thereof with the metallic shielding tape. An advantage of using the skid wires alone as the sensors is that the cost of the cable will be negligibly increased by the addition of the nylon coating.

Modern practice is to coat the inside of the steel pipe with an epoxy coating. This is advantageous for the skid-wire sensor since if the nylon coating should be damaged on pulling in the cable, it is extremely unlikely that a break in the nylon coating will register with a holiday in the epoxy coating to give a false reading of resistance.

For accurate distance measurements the sensors should be made of a metal having very low temperature coefficient of resistance, such as constantan or manganin, so that the resistance determinations will be independent of temperature. Since this might be impractical in the case of the skid wires, measurements on intact skid wires of the other phases of the line, which should be at the same temperature, will provide a base for proportioning the distance to the fault.

As another application of this invention, resistance measurements can be made to determine the external temperature of an insulated conductor. If the strip conductor 17 is composed of a material having a high temperature coefficient, the full line resistance will vary as a function of temperature, permitting calibrated resistance measurements indicative of the external conductor temperature. In such case, as mentioned above, the intact sensors may be used as a reference for proportioning the distance to a fault. An alternate procedure is to utilize a temperature-sensitive material in the skid wires, for temperature measurements, and a temperature-insensitive material in the ribbon sensor, for distance measurements. Such temperature measurements are made in the same way as the full length resistance calibration measurement.

It is to be understood that the sensors, or skid wires used as sensors, are easily jumpered around any splices that are made in the cables, so that appropriate measurements may be made from either or both ends.

Although I have described and illustrated the sensors and/or skid wires as being disposed about the cable in a double helix, it is obvious that any desired plurality of such sensors may be used.

I claim:

1. Apparatus for locating a fault in a pipe-type cable including an insulated conductor having a wrapped external metallic shielding tape, comprising:
   a. elongated electrically conducting senor means helically wound over and insulated from said shielding tape;
   b. said sensor means comprising an elongated helically wound metallic sensing conductor provided with an envelope of thermoplastic material, said sensor means having a flat surface contiguous with said shielding tape to provide in cooperation therewith a substantial lineal capacitance proportional to the length of said sensing conductor;
   c. said sensor means, as a result of dissipation of heat upon the occurrence of a fault, having a substantial probability alternatively of making electrical contact with said shielding tape and of becoming open circuited at the fault; and
   d. impedance measuring means coupled at a suitable measuring point to said sensor means and to said shielding tape for measuring electrical impedance parameters proportional to the length of said sensor means, whereby to determine the length of said cable from said measuring point to the location of the fault.

2. Apparatus according to claim 1 wherein said sensing conductor is relatively broad and very thin.

3. Apparatus according to claim 1 wherein said sensor means has a relatively high level resistance compared with the lineal resistance of said shielding tape.

4. Apparatus according to claim 3 wherein said sensor means comprises a metallic sensing conductor having a relatively low temperature coefficient of resistivity.

5. Apparatus according to claim 1 wherein said senor means comprises a skid wire of D-shaped transverse section.

6. Apparatus according to claim 1 wherein said sensor means comprises a plurality of helically wound sensing conductors, each provided with an envelope of thermoplastic electric insulation.

7. Apparatus for locating a fault in a pipe-type cable, comprising:
   a. a metallic shielding tape wrapped externally around said cable;
   b. elongated electrically conducting sensor means helically wound over and insulated from said shielding tape said sensor means comprising an elongated helically wound metalic sensing conductor provided with an envelope of thermoplastic material, said sensor means having a flat surface contiguous with said shielding tape to provide in cooperation therewith a substantial lineal capacitance proportional to the length of said sensing conductor;
   c. said sensor means and said shielding tape cooperating to form a transmission line of measurable impedance;
   d. said sensor means, as a result of dissipation of heat upon the occurrence of a fault, having a substantial probability alternatively of making electrical contact with said shielding tape and of becoming open circuited at the fault; and e. impedance measuring means coupled at a suitable measuring point to said senor means and to said shielding tape for measuring electrical impedance parameters proportional to the length of said sensor means, whereby to determine the length of said cable from said measuring point to the location of the fault.

8. A system for determining average external temperature of an energized insulated power conductor having a wrapped external metallic shielding tape, comprising:
   a. an elongated electrically insulated relatively broad and flat surfaced metallic sensing conductor helically wound over and contiguous with said shielding tape;
   b. said sensing conductor having relatively high lineal resistance and a relatively high temperature coefficient of resistivity;
   c. the electrical insulation between said sensing conductor and said shielding tape being relatively very thin to minimize the thermal resistance therebetween; and
   d. resistance measuring means coupled to said sensing conductor and to said shielding tape for measuring the series resistance of said sensing conductor and said shielding tape over a predetermined length of said power conductor for comparison with a previously determined calibration resistance measurement over said predetermined length of said power conductor at a know temperature, whereby the average temperature of said sensing conductor may be readily calculated.

PO-1050
(5/69)

UNITED STATES PATENT OFFICE
CERTIFICATE OF CORRECTION

Patent No. 3,588,689            Dated June 28, 1971

Inventor(s) Harry F. Crawford

It is certified that error appears in the above-identified patent and that said Letters Patent are hereby corrected as shown below:

Column 4, Line 46, after "high", change "level" to --lineal--.

Signed and sealed this 21st day of December 1971.

(SEAL)
Attest:

EDWARD M. FLETCHER, JR.          ROBERT GOTTSCHALK
Attesting Officer                 Acting Commissioner of Patents